United States Patent [19]

Ohnishi et al.

[11] 4,449,154

[45] May 15, 1984

[54] SAMPLING TIME CONTROL CIRCUIT FOR USE IN AN AUDIO CASSETTE TAPE DATA PROCESSOR

[75] Inventors: Souichi Ohnishi, Yao; Kensaku Komai, Yamatokoriyama, both of Japan

[73] Assignee: Sharp Kabushiki Kaisha, Osaka, Japan

[21] Appl. No.: 297,357

[22] Filed: Aug. 28, 1981

Related U.S. Application Data

[63] Continuation-in-part of Ser. No. 123,480, Feb. 21, 1980.

[30] Foreign Application Priority Data

Feb. 21, 1979 [JP] Japan .............................. 54-19962
Feb. 21, 1979 [JP] Japan .......................... 54-22314[U]

[51] Int. Cl.$^3$ ............................................... G11B 5/09
[52] U.S. Cl. .................................................... 360/51
[58] Field of Search ................. 360/51, 27, 28, 73, 360/7, 8, 32

[56] References Cited

U.S. PATENT DOCUMENTS

| 3,571,801 | 3/1971 | Coolidge et al. | 360/51 |
| 3,789,379 | 1/1974 | Breikss | 360/51 |
| 4,143,407 | 3/1979 | Liberry | 360/51 |

*Primary Examiner*—Vincent P. Canney
*Attorney, Agent, or Firm*—Birch, Stewart, Kolasch & Birch

[57] ABSTRACT

A data reading device comprises a first circuit for reading out selected part of data recorded in an audio cassette tape, a control circuit responsive to the first circuit for regulating the interval of sampling time, and a second circuit responsive to the control circuit for reading out the remaining part of the data recorded in the audio cassette tape according to the interval of the sampling time determined by the control circuit.

8 Claims, 9 Drawing Figures

SAMPLING TIME CONTROL CIRCUIT FOR USE IN AN AUDIO CASSETTE TAPE DATA PROCESSOR

This application is a continuation-in-part of co-pending Ser. No. 123,480, filed Feb. 21, 1980, of Souichi Ohnishi and Kensaku Kamai, for Sampling Time Control Circuit for Use In An Audio Cassette Tape Data Processor.

BACKGROUND OF THE INVENTION

The present invention relates to a data recorder for recording data into a cassette tape unit. More particularly, the present invention relates to a data recorder for recording check data and true data into a cassette tape unit.

Recently, an audio cassette tape has been employed for storing data in the form of analog information useful for an electronic apparatus of a stored program system. In introducing data from the audio cassette tape to an entry means for the electronic apparatus, the data has been taken out through earphone terminals which were connected to a sound volume adjustment circuit of a cassette tape deck. Therefore, adjustment of sound volume greatly affects the reliability of the data introduced. A conventional audio cassette tape format comprises only a non-recorded section and a recorded section. Data is entered into the recorded section while an appropriate error check operation is being performed. If errors are detected, the operator is informed of the presence of the errors and directed to adjust the sound volume with the help of only his perception, and to repeat the entry operation from the beginning.

That is, using the conventional audio cassette tape format, it is difficult to adjust the amplitude of the sound volume, thereby resulting in inefficient data entry to a new cassette tape apparatus.

In connection with a new type of cassette tape apparatus, there was filed by S. Onishi et al., U.S. Patent Application Ser. No. 82,333 on Oct. 5, 1979, assigned to the present assignee. The German counterpart Patent Application was filed on Oct. 10, 1979 as No. P 29 41 147.0.

In general, the speed of a cassette tape which a first cassette tape apparatus achieves is not identical to that which a second cassette tape apparatus attains. In such a case, a considerable difference in the speed of the cassette tapes precludes accurate readout of the data from the first cassette tape because of the discrepancy in sampling time between the first and the second cassette tape apparatuses.

SUMMARY OF THE INVENTION

Accordingly, it is a primary object of the present invention to provide a new control system useful for reading data from an audio cassette tape.

It is a further object of the present invention to provide an improved cassette tape reader for enabling precise control for data readout.

It is another object of the present invention to provide an improved cassette tape reader for making sure that effective data is introduced into the cassette tape reader.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a data reading device comprises a first circuit for reading out a selected part of the data recorded in an audio cassette tape, a control circuit responsive to the first circuit for regulating the interval of sampling time, and a second circuit responsive to the control circuit for reading out the remaining part of the data recorded in the audio cassette tape according to the interval of the sampling time determined by the control circuit.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
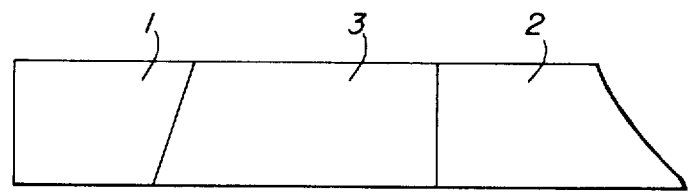
FIG. 1 is a format diagram of a recorded cassette tape adapted to a data reader of the present invention.

With reference to FIG. 1, a cassette tape adapted to be used with a data reader of the present invention comprises a non-recorded section 1, a data section 2, and a tape speed control section 3.

The non-recorded section 1 contains no signal information. The data section 2 is used to record true or effective data. The effective data normally constitutes analog information. It may be in digital form as in a high quality cassette tape. The tape speed control section 3 is used to contain tape speed control data useful for regulating the sampling time according to which the effective data is read out from the data section 2.

Figure 2:
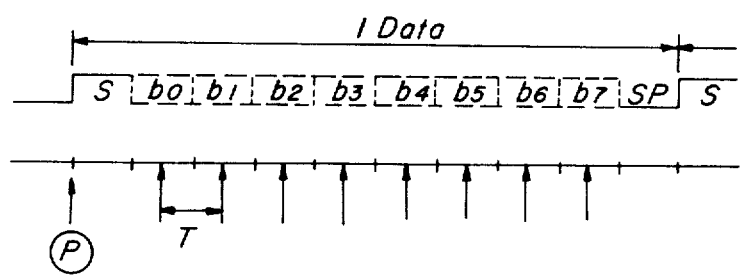
FIG. 2 is a schematic representation of relations between data recorded in the cassette tape shown in FIG. 1 and sampling time therefor useful for reading the recorded data.
Figure 3:
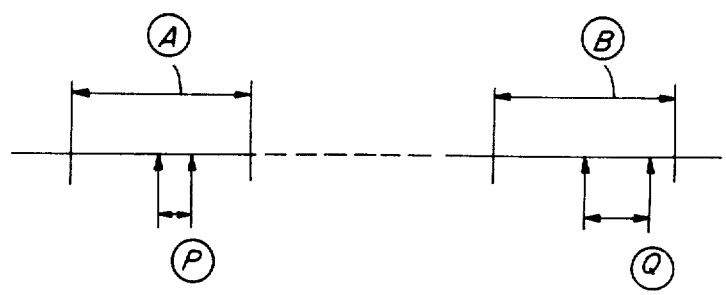
FIG. 3 is a graph explaining inaccurate control by the sampling time caused in the conventional data reader.

With reference to FIGS. 2 and 3, operations of the sampling time useful for reading the effective data are described. The effective data from the data section 2 is applied to a control circuit for reading purposes in a bit-serial order of a plurality of bits b0, b1, ... b7, starting at a start bit S. The control circuit detects the start bit S because of the change in the binary digit. Thereafter it samples the effective data at a certain time interval T. The time internal T is called the readout sampling time. The respective edges of the time interval T are allocated in the middle of the bits b0 to b7 to maximize the margin. The maximum margin is 50%.

It is assumed that a cassette tape recorded by a data recorder A is read by a data reader B, and that there is a difference in tape travel speed between the data recorder A and the data reader B.

As shown in FIG. 3, the edge of the time interval T performed in the data reader B is assumed to be erroneously allocated in a portion Ⓟ deviated backward from an accurate middle portion in connection with the first data bit Ⓐ. The ratio of the deviation from the accurate middle portion should be +n%. In such a case, in the 8th data bit B, the deviation from the accurate middle should be increased increase up to (n×8) %, as pointed out by a portion Ⓠ. To ensure the accurate readout of the effective data, it is necessary to maintain the equation, (n×8)%<50%. It is determined that n<6.25. By considering wow and flutter in the data reader B and an adequate amount of the margin, the initial deviation ratio n% from the accurate middle portion must be less than 6%.

Therefore, the difference in the tape travel speed between the data recorder A and the data reader B must be within ±3%.

The cassette tape adapted for the data reader B which caused the inaccurate sampling control as shown in FIG. 3 does not include the tape speed control section 3 as opposed to the cassette tape adapted for the present invention.

Figure 4:
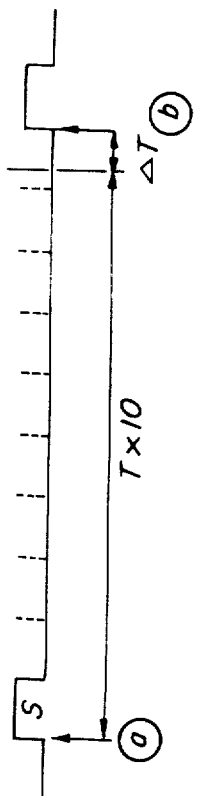
FIG. 4 is a graph explaining sampling time modification system caused by the sampling time according to the present invention.

FIG. 4 is a graph explaining the sampling time control system using the tape speed control section 3 of the cassette tape according to the present invention. In this instance, the tape speed control section 3 records ten-bit information inclusive of the start bit S. During the readout of the ten-bit information stored in the tape speed control section 3, a period of time from first timing ⓐ to last timing ⓑ is detected. If the period of time is more than a standard period of time T×10 by ΔT, wherein T is the unit time interval (the readout sampling time), the unit time interval T is changed to an amount of (T+ΔT/10) because of the presence of ten bits.

Generally speaking, assuming that the tape speed control section 3 records n-bit information, the unit time interval T (the readout sampling time) should be changed as follows dependent on the total amount of time period from the first timing ⓐ to the last timing ⓑ:

(1) The total time period is more than the normal period of time by ΔT:

T+ΔT/n (2) The total time period is less than the normal period pf time by ΔT:

T−ΔT/n

Figure 5:
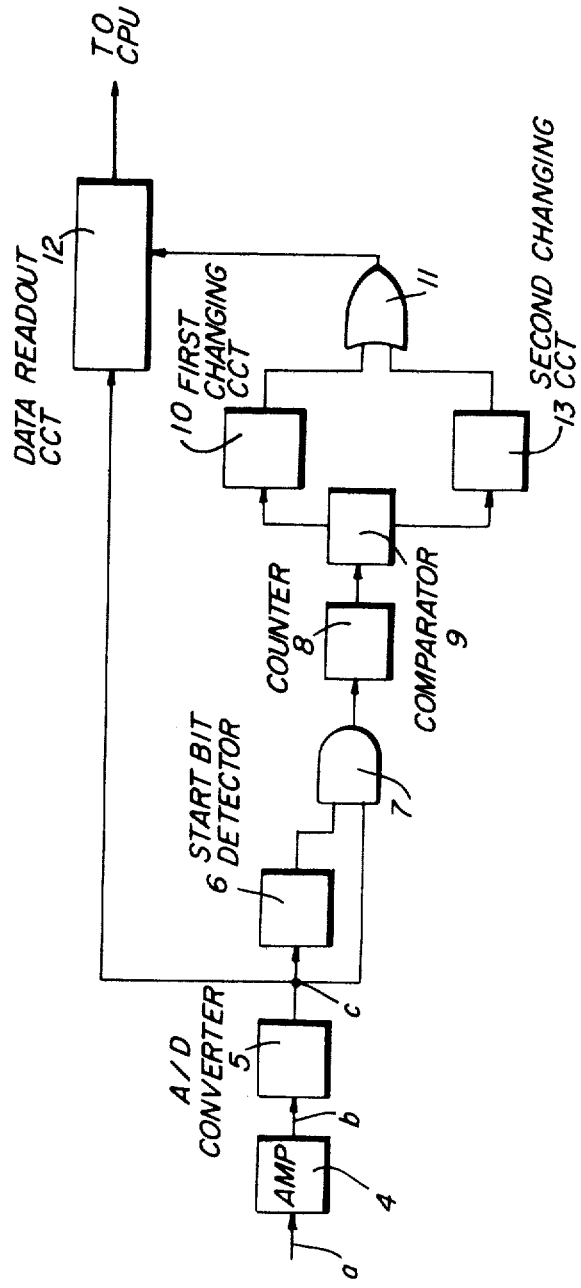
FIG. 5 is a block diagram of a control circuit incorporated within the data reader of the present invention.

FIG. 5 shows a block diagram of a control circuit for changing the unit time interval (the readout sampling time) according to the present invention. The control circuit comprises an amplifier 4, an A/D converter 5, a start bit detector 6, an AND gate 7, a counter 8, a comparator 9, a first changing circuit 10, an OR gate 11, a data readout circuit 12, and a second changing circuit 13. When the readout of the tape speed control data is carried out from the tape speed control section 3, the readout data is admitted to the amplifier 4 through a data line a. The readout data is amplified by the amplifier 4. The analog information of the readout data is transformed into the corresponding digital information by the following A/D converter 5. A/D converter 5 functions to convert the continuous analog input waveform containing the digital information into a digital information signal. The digital information of the readout data is introduced into the start bit detector 6. The start bit detector 6 serves to detect the start bit S in the readout data. When it detects the start bit S, it allows the AND gate 7 to conduct the digital information of the readout data from the A/D converter 5 to the counter 8. The counter 8 functions to count the total time period in connection with all of the bits recorded in the tape speed control section 3, for example, 10 bits.

Output signals from the counter 8 represent the total time period with the 10 bits which is presently measured. The output signals from the counter 8 are applied to the comparator 9 so that the comparator 9 compares the measured total period of time with the normal total period of time 10×T which is memorized in the comparator 9 preliminarily. The normal total period of time 10×T can be identified since the length of the tape speed control section 3 is identical between the cassette tapes and the data reader driving the cassette tapes keeps the travel of the cassette tapes constant. When the measured total period of time is more than the memorized normal total period of time 10×T by ΔT, the comparator 9 develops output signals applied to the first changing circuit 10, the output signals representing the deviation ΔT. The first changing circuit 10 is responsive to the output signals of ΔT for determining a new unit time interval of the readout sampling time, in connection with the readout which is presently carried out as (T+ΔT/10). The resultant new unit time interval (readout sampling time) of (T+ΔT/10) is entered to the data readout circuit 12 through the OR gate 11. The data readout circuit 12 also receives the digital information of the readout data from the A/D converter 5. The data readout circuit 12 samples the received digital information according to the modified unit time interval (readout sampling time) of (T+ΔT/10).

Otherwise, when the measured total period of time is less than the memorized normal total period of time 10×T by ΔT, the comparator 9 develops output signals entered into the second changing circuit 13, the output signals representing the deviation ΔT. The second changing circuit 13 calculates a new unit time interval (readout sampling time) of T−ΔT/10). The new unit time interval is introduced to the data readout circuit 12 through the OR gate 11. The data readout circuit 12 samples the received digital information according to the modified unit time interval (readout sampling time) of (T−ΔT/10).

It may be possible that the normal total period of time 10×T is extremely applied to and kept in the comparator 9, so that the control circuit is applicable to any type of cassette tapes which have various characteristic unit time intervals (readout sampling times).

Figure 6:
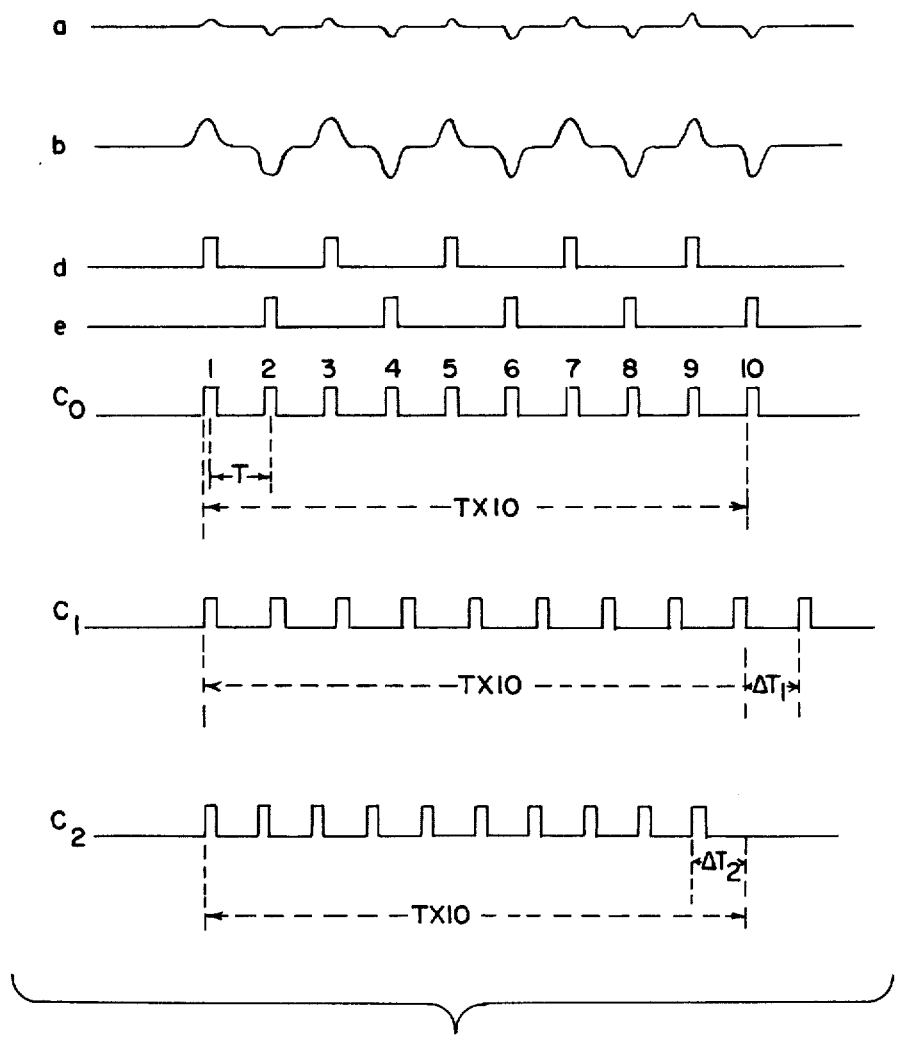
FIG. 6 is a timing diagraph of representative waveforms occurring within the control circuit of FIG. 5.

FIG. 6 shows representative waveforms of signals occurring within the circuit of FIG. 5, wherein a is a waveform of linear signals representing signals read from zone 3 of a magnetic tape with a magnetic head. These signals are carried by the data line a in the circuit of FIG. 5. The amplifier 4 amplifies the signals a to provide the signals b shown in FIG. 6. The A/D converter 5 cuts a positive peak and a negative peak of the signals b with some threshold level to provide signals d and e (FIG. 6). These signals are modified to generate digital signals $C_0$ (FIG. 6) corresponding to the signals a.

The formed signals $C_0$ (or $C_1$ or $C_2$ depending upon speed variations) are applied to the start bit detector 6 and the AND gage 7, and further to the data readout circuit 12. The readout circuit 12 does not initiate its read-in operation because it does not memorize the read-in time period. When the start bit S is detected by the start bit detector 6, the digital signals flowing through the AND gate 7 are applied to the counter 8. The counter 8 functions to count these signals for a period of 10 bits to obtain the corresponding total time interval. The total time interval is entered into the comparator 9. The normal time interval $T \times 10$, which is preliminarily memorized, is compared with this now measured and readout time interval represented by either $T \times 10 + \Delta T_1$ or $T \times 10 - \Delta T_2$. When the result indicates that the now measured and readout time interval (waveform $C_1$) is greater than the normal total time interval, the first changing circuit 10 is operated to calculate $T + \Delta T/10$ and to define a new normalized unit time interval $(T + \Delta T/10)$. When the result indicates that the now measured and readout time interval (waveform $C_2$) is shorter than the normal total time interval, the second changing circuit 13 is operated to calculate $(T - \Delta T/10)$ and to define a new normalized unit time interval for the readout time information.

The thus defined normalized unit time interval is applied to the data readout circuit 12 through the OR gate 11. As long as the new normalized unit time interval is defined, the data readout circuit 12 continues to sample the ensuing data with this defined normalized unit time interval.

In the signals shown in FIG. 6, the signals $C_0$ indicate those in a normal speed, $C_1$ signals indicate those at a delayed speed more than the normal speed, and signals $C_2$ represent those at a speed more rapid than the normal speed.

Figure 7:
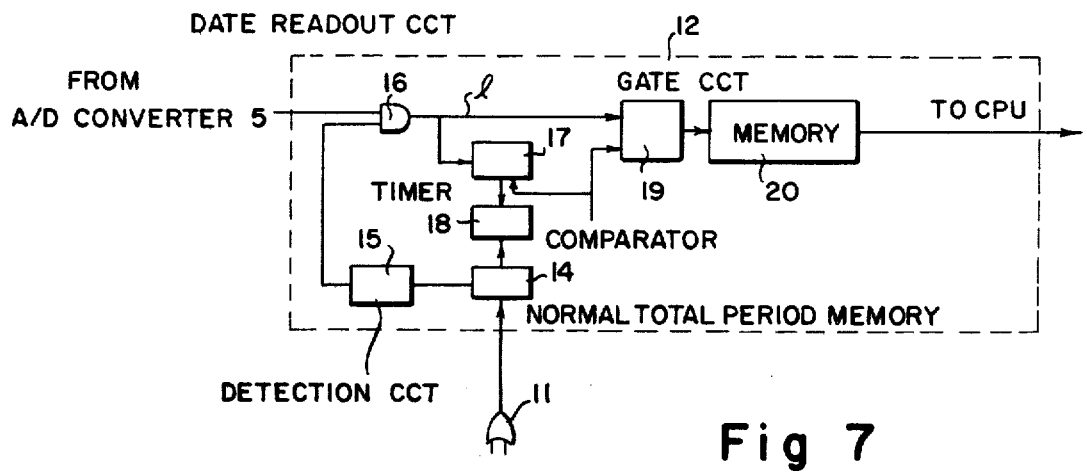
FIG. 7 is a block diagram of a preferred embodiment of the data readout circuit of FIG. 5.

Referring now to FIG. 7, a circuit configuration of the data readout circuit 12 is shown as comprising an input AND gate 16 having as one of its inputs the output signal c of the A/D converter 5. The other input of the input AND gate 16 is the output of a detection circuit 15, which is connected at its input to the output of a normalized time period memory 14. The normalized time period memory is driven by, and stores the normalized time information representative of that one of the new normalized unit time intervals $(T + \Delta T/n)$ and $(T - \Delta T/n)$ received through the OR gate 11 from the first and second interval changing circuits 10 and 13, respectively.

The normalized time interval memory 14 has another output connected to the input of a comparator circuit 18, which is also driven by the output of timer 17. The timer 17 is enabled by the output of the input AND gate 16.

The output of the comparator 18 and the input AND gate 16 both drive an output gate circuit 19 while the comparator output further acts to control the timer 17, as will be hereinafter more fully described.

The output gate circuit 19, when enabled by the comparator 18, passes the output from the input AND gate 16 to a data memory circuit 20, from whence the speed corrected data (sampled at the sampling rate determined by the normalized unit time interval) is fed to a central processing unit CPU for further corrections.

The operation of the data readout circuit is as follows:

When the normalized total time interval developed from either of the first and second changing circuits 10 and 13 is applied to the normalized period memory circuit 14 through the OR gate 11, the detection circuit 15 responds to the fact that the said memory circuit 14 is storing time information and enables the input AND gate 16.

When the AND gate 16 is enabled (rendered conductive), the $C_0$ signals (FIG. 6) from the A/D converter 5 are passed through the input AND gate 16 to its output lead 1, the firstly-occurring signal on line 1 making the timer 17 operative to initiate a counting operation of the information from zone 2 of the tape being read to determine its sampling rate (unit time interval). The counted information is compared with the normalized unit time information (sampling rate) stored in the memory circuit 14 by the comparator 18. If this comparison indicates that they agree, the comparator 18 outputs signals for making the output gate 19 conductive and ensuing data signals representative of "1" or "0" on the line 1 are applied to the memory 20 for storage purposes.

The timer 17 is reset in response to the output from the comparator 14 indicating that the sampling rates agree.

The present sampling operation is held as described above. The information stored in the memory 20 is applied to a CPU in an electronic apparatus such as an electronic cash register for further corrections and/or utilization as required.

Figure 8:
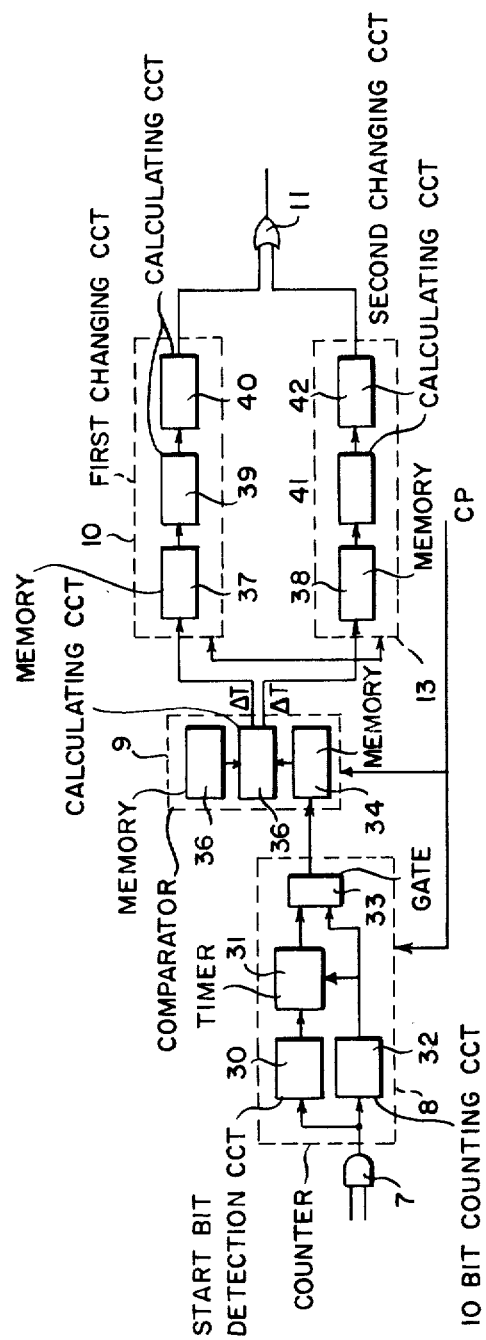
FIG. 8 is a more detailed circuit configuration of circuit elements in the circuit of FIG. 5.

FIG. 8 shows a more detailed circuit configuration of the circuit elements 8, 9, 10 and 13 of FIG. 5. The counter 8 in FIG. 5 comprises a start bit detection circuit 30, a timer 31, a 10 bit counting circuit 32, and a gate circuit 33. The comparator 9 in FIG. 5 comprises two memory circuits 34 and 36, and a calculating circuit 35. The first changing circuit 10 in FIG. 5 comprises a memory circuit 37 and two calculating circuits 39 and 40. The second changing circuit 13 in FIG. 5 comprises a memory circuit 38 and two calculating circuits 41 and 42.

When the start bit S is detected by the start bit detector 6 in FIG. 5, the digital signals are applied to the counter 8 through the AND gate 7. In response to application of the digital signals, the start bit detection circuit 30 detects the start bit S, so that it operates the timer 31. The data are applied to 10 bit counting circuit 32 so that the circuit 32 counts the data for the period of 10 bits. When the counting is ended, the circuit 32 makes the timer 31 stop and, through the gate circuit 33, the data counted for the period of 10 bits are sent from the circuit 32 to the memory circuit 34 in the comparator 9.

Thus, the memory circuit 34 receives the data of $10 \times T + \Delta T$. In response to application of these data, the calculating circuit 35 is operated to obtain $\pm \Delta T$ by subtracting $(10 \times T)$ from $(10 \times T \pm \Delta T)$. The memory circuit 36 stores the normal total period of time, $10 \times T$ which is sent to the calculating circuit 35.

The plus deviation $+\Delta T$ is sent to the memory circuit 37 in the first changing circuit 10 while the minus deviation $-\Delta T$ is sent to the memory circuit 38 in the second changing circuit 12.

The first calculating circuit 39 in the circuit 10 functions to obtain $\Delta T/10$ from $\Delta T$. The second calculating circuit 40 in the circuit 10 functions to obtain $T + \Delta T/10$ from T and $\Delta T/10$. Thus, the new normalized unit time interval $(T + \Delta T/10)$ is defined.

The third calculating circuit 41 in the circuit 13 is provided to obtain $-\Delta T/10$ from $-\Delta T$ applied to the memory circuit 38. The fourth calculating circuit 41 in the circuit 13 is provided to obtain $T-\Delta T/10$ from T and $-\Delta T/10$. Thus, the new normalized unit time interval $(T-\Delta T/10)$ is defined.

The new normalized unit time interval $T+\Delta T/10$ or $T-\Delta T/10$ is applied to the readout circuit 12 through the OR gate 11.

Figure 9:
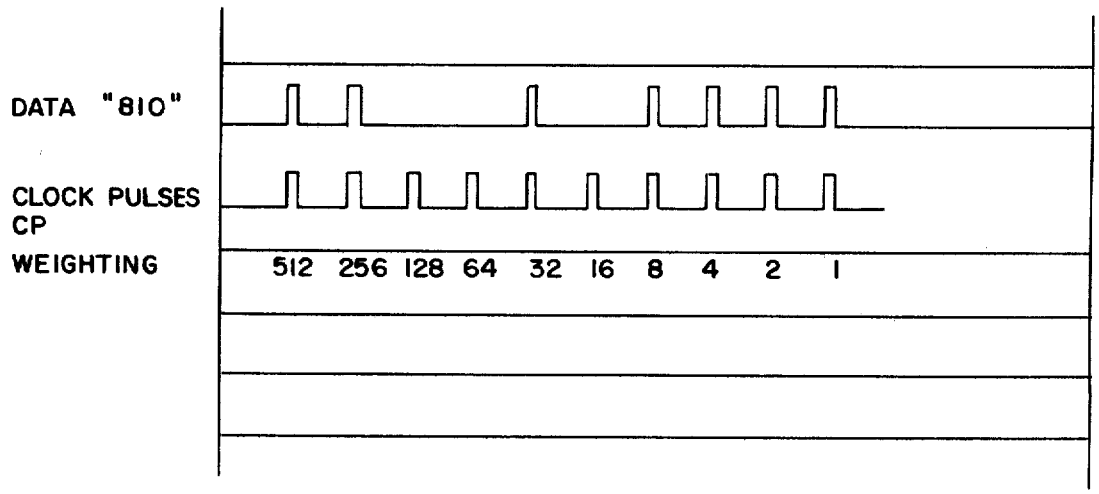
FIG. 9 is a timing diagraph of representative waveforms occurring within the circuit elements of FIG. 8.

The clock pulses CP are applied to the counter 8, the comparator 9, the first changing circuit 10 and the second changing circuit 13. The clock pulses CP are binary codes which are weighted. So the signals from the OR gate 11 to the data readout circuit 12 are also weighted. The signals represent duration of time. FIG. 9 shows an exemplary wave form of the signals.

While only certain embodiments of the present invention have been described, it will be apparent to those skilled in the art that various changes and modifications may be made therein without departing from the spirit and scope of the invention as claimed.

What is claimed is:

1. Data reading means for determining a compatible data sampling interval for reading previously recorded data from a cassette tape, said tape having selected initial data thereon representative of actual data sampling intervals corresponding to the recorded speed of ensuing previously recorded data, comprising:
   input means for reading out said selected initial data from said cassette tape;
   regulating means having reference data sampling interval information stored therein and responsive to said input means for comparing said actual data sampling intervals for said recorded data with said reference data sampling interval information and providing a control signal representative of a compatible data sampling interval for reading ensuing data from said tape; and
   data readout means, responsive to said control signal and said ensuing data from said cassette tape, for sampling said ensuing data over said compatible sampling intervals, said data readout means including,
   normalized memory means for receiving and storing said control signal,
   data receiving means for determining actual perceived data sampling time intervals for said ensuing data,
   comparison means responsive to said stored control signal and said data receiving means for determining a condition of identity between said actual perceived data sampling and compatible time intervals and providing an enabling signal in response thereto;
   holding memory means for receiving said ensuing data sampled over said compatible sampling time intervals; and
   gate means, responsive to said enabling and control signals, for sampling said ensuing data over said compatible sampling time intervals and admitting the sampled data to said holding memory means.

2. The data reading means means according to claim 1, wherein said data readout means retransmits said data sampled at said compatible rate for further processing.

3. The data recording means according to claim 1 wherein said data readout means retransmits sampled data from said holding memory means for further processing.

4. The data recording means according to claim 1 wherein said data receiving means comprises:
   detection circuit means responsive to said normalized memory means for providing a gating signal in response to receipt of said control signal by said normalized memory means;
   AND gate means responsive to said ensuing data and said gating signal for admitting said data; and
   timer means responsive to said admitted data for providing an interim signal to said comparison means representative of said actual perceived data sampling interval and responsive to said enabling signal to reset upon the establishment of said condition of identity.

5. The data recording means according to claim 4, wherein said data readout means retransmits sampled data from said holding memory means for further processing.

6. Data reading means for determining a compatible data sampling interval for reading previously worded data from a cassette tape, said tape having selected initial data thereon representative of actual data sampling intervals corresponding to the recorded speed of ensuing previously recorded data comprising:
   input means for reading out said selected initial data from said cassette tape; and
   regulating means having reference data sampling interval information stored therein and responsive to said input means for comparing said actual data sampling intervals for said recorded data with said reference data sampling interval information and providing a control signal representative of a compatible data sampling interval for reading ensuing data from said tape, said regulating means including,
   counter means responsive to the occurrence of said selected initial data providing a count signal representative of a time period coextensive therewith,
   comparison means containing said reference data sampling interval information for receiving said count signal and determining the difference between said reference data sampling interval and said actual data sampling intervals, and
   sensing means responsive to the sense of said difference for providing said control signal representative of said compatible data sampling interval.

7. The data reading means according to claim 6, wherein said sensing means comprises:
   first and second changing means responsive to those conditions wherein said actual data sampling interval is greater than and less than said reference sampling interval respectively, for constraining said control signal to correspond to those respective conditions.

8. The data reading means of claim 6 wherein said cassette tape is an audio cassette tape.

* * * * *